United States Patent
Teng et al.

Patent Number: 5,710,677
Date of Patent: Jan. 20, 1998

[54] METHOD OF DETECTING AND ISOLATING DEFECTIVE SERVO BURSTS

[75] Inventors: Jack Ming Teng; Peng Yeong Loh, both of Singapore, Singapore

[73] Assignee: Seagate Technology, Inc., Scotts Valley, Calif.

[21] Appl. No.: 575,414

[22] Filed: Dec. 18, 1995

[51] Int. Cl.$^6$ ................................................ G11B 5/596
[52] U.S. Cl. .............................. 360/77.08; 360/75
[58] Field of Search ........................ 360/77.08, 77.05, 360/77.02, 75

[56] References Cited

U.S. PATENT DOCUMENTS

| | | | |
|---|---|---|---|
| 4,412,165 | 10/1983 | Case et al. | 360/77.08 X |
| 5,434,725 | 7/1995 | Hirose et al. | 360/77.02 X |

FOREIGN PATENT DOCUMENTS

| | | | |
|---|---|---|---|
| 1-271981 | 10/1989 | Japan | 360/77.08 |
| 5-303854 | 11/1993 | Japan | 360/77.08 |

Primary Examiner—Aristotelis M. Psitos
Assistant Examiner—James L. Habermehl
Attorney, Agent, or Firm—Edward P. Heller, III; Raghunath S. Minisandram

[57] ABSTRACT

A method to accurately determine a defective servo burst written on a recording medium having plurality of tracks, each track containing plurality of position data portions. The position data portions include servo bursts capable of providing position error information, which can be selectively retrieved by a servo control system having a servo gate enabling signal. A first likely defective servo burst is identified by reading each servo burst, measuring corresponding position error information and comparing to a range of acceptable position error information. While disabling retrieval from the first likely defective servo burst, the position error information of plurality of servo bursts occurring after the first likely defective servo burst is measured. If the measured values are within the acceptable range, the first likely defective servo burst is concluded as the first confirmed defective servo burst. If not, plurality of servo bursts occurring prior to the first likely defective servo burst are selectively disabled and subsequent servo bursts are measured until a skipped servo burst is concluded as a first confirmed defective servo burst. While disabling retrieval from first confirmed defective servo burst, subsequent servo bursts are measured to find a second likely defective servo burst. By selectively disabling retrieval of second likely defective servo burst and plurality of servo bursts prior to second likely defective servo burst, a second confirmed defective servo burst is also determined. Then the first confirmed defective servo burst and second confirmed defective servo bursts are permanently marked.

14 Claims, 5 Drawing Sheets

5,710,677

METHOD OF DETECTING AND ISOLATING DEFECTIVE SERVO BURSTS

BACKGROUND

This invention relates generally to a magnetic disc memory system and more particularly the invention relates to a servo positioning system in a magnetic disc memory system.

The function of a servo positioning system is to keep the heads at the center of a data track and move the heads from one data track to another. In a closed loop servo positioning system, a voice-coil actuator with attached head, amount of movement is controlled by controlling the amount of current in the voice-coil and direction of movement is controlled by the direction of current in the voice-coil. Further, servo positioning information written on the disk media is used by a controller to determine the amount and direction of current to be applied to the voice-coil actuator, to move the heads to a desired track and maintain heads at the center of a desired track. The servo position information contains servo bursts capable of providing the location and direction of heads relative to the track center.

In a disc memory system, the servo position information could be written on a dedicated disc media as in a dedicated servo system or written on each track, intermingled with user data portions as in an embedded servo system. Servo bursts are written on a disk media during the manufacture of a magnetic disk memory system. After writing servo bursts, they are read back to verify if they are defective, including due to defective media or badly written signal. If the servo burst read back is deemed defective, a known signal is written over the servo burst so that during a subsequent reading of the servo burst, the controller will not erroneously change the amount or direction of current to be applied to the voice-coil. Without this step, the controller would recalculate the amount or direction of current to be applied to the voice-coil, thereby erroneously shifting the position of the head and subsequently readjusting the position of the head based upon the information provided by subsequent servo burst signals resulting in an impulse response and some degree of oscillation set in the positioner assembly.

In the current practice, a servo burst that produces highest offset from a mean value is deemed to be a likely defective servo burst. Upon this conclusion, likely defective servo burst is rewritten with a known signal.

There is a possibility that the defective servo burst is one or two servo bursts before the servo burst that produced highest offset. Hence, in the present method, uncertainty exists as to the accuracy of determining a likely defective servo burst.

The number of servo bursts that could be rewritten with a known signal is also limited, as with the removal of the signal, the control loop would be operating in an open loop i.e., the head could be moved away from the center of the track due to lack of position samples or low sampling rate.

Further more, this method of potentially inaccurately determining a likely defective servo and rewriting with a known signal is a destructive method not allowing for easy correction, thereby needing a complete rewrite of the servo burst signals adding to increased cost and time in manufacture of a magnetic disc memory system.

SUMMARY OF THE INVENTION

It is an object of this invention to accurately determine a defective servo burst written on a magnetic memory disc media during the manufacture of a magnetic disc memory system. It is a further object of this invention to use a method to temporarily disable a likely defective servo burst and validate whether the position information received after disabling a likely defective servo burst is acceptable. If the position information received is not acceptable, then temporarily disabling successive servo bursts prior to the suspected likely defective servo burst until the position information received is acceptable. Then, the temporarily disabled servo burst that yielded an acceptable position information is appropriately marked with a known signal so that the servo control system will not react to the information contained in the marked servo burst.

DETAILED DESCRIPTION OF PREFERRED EMBODIMENT

Figure 1:
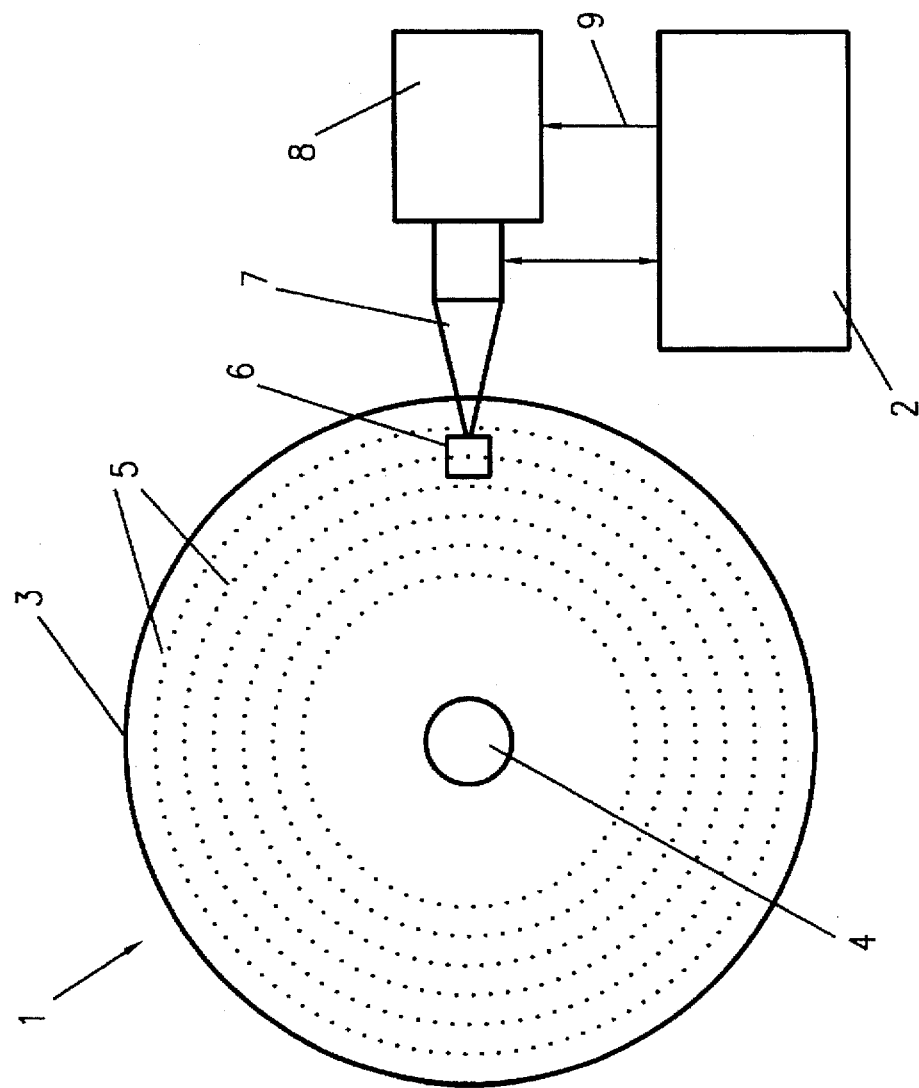
FIG. 1 shows a head-disc assembly subsystem of a magnetic disc memory system, including tracks.

FIG. 1 shows a head-disc assembly subsystem 1 of a magnetic disc memory system with associated servo control system 2. A disc media 3 is attached to a spindle motor 4, enabling rotation of the disc media 3. Plurality of tracks 5 are written during a manufacturing process, with each track 5 containing plurality of information data. A head 6 attached to a head arm assembly 7 is connected to a positioner assembly 8. The information data from the disc media 3 is read by head 6 and fed to the servo control system 2 after appropriate preamplification. Depending upon a positioning signal 9 received from the servo control system, the positioner assembly 8 moves the head 6 across the disc media 3 to position the head 6 on a track 5 so that information data can be either written on a track 5 or read from a track 5.

Figure 2:
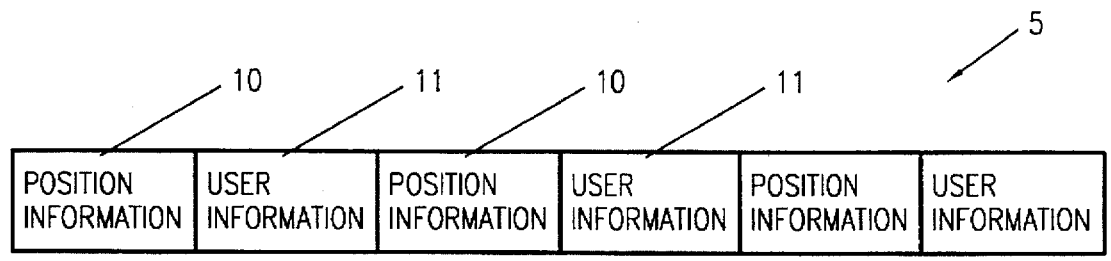
FIG. 2 shows typical layout of a track in a magnetic disc memory system, including position information data portions.

FIG. 2 shows typical layout of a track 5. The information data contained in a track include plurality of position information data 10 portions and user information data 11 portions.

Now referring to FIG. 1 and FIG. 2, during a positioning operation, the position information data 10 read from the disc media 3 is utilized by the servo control system 2 to determine the position of the head 6 relative to a track 5 and issue appropriate positioning signal 9 to the positioner assembly 8 so that head 6 can be positioned accurately on a track 5.

Figure 3:
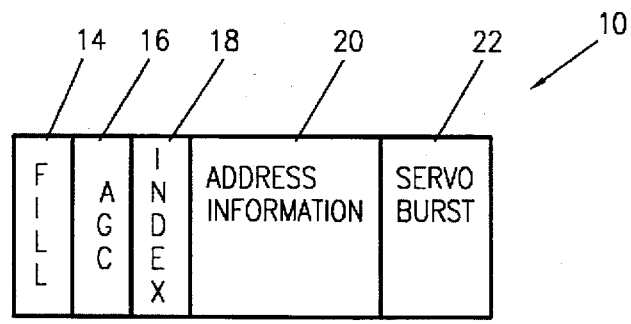
FIG. 3 shows typical information component of a position information data portions, including servo burst component.

FIG. 3 shows typical information component of a position information data 10 portion of a track. These information components are fill 14, AGC 16, index 18, address information 20 and servo burst 22. The address information 20 contains the track address and the servo burst 22 information provides the position of the head 6 relative to a track center. The fill 14, AGC 16, index 18 and part of address information 20 provide necessary timing and setup information for the servo control system 2 so that servo burst 22 read from the disc media 3 can be appropriately gated into servo control system 2 circuits.

Figure 4:
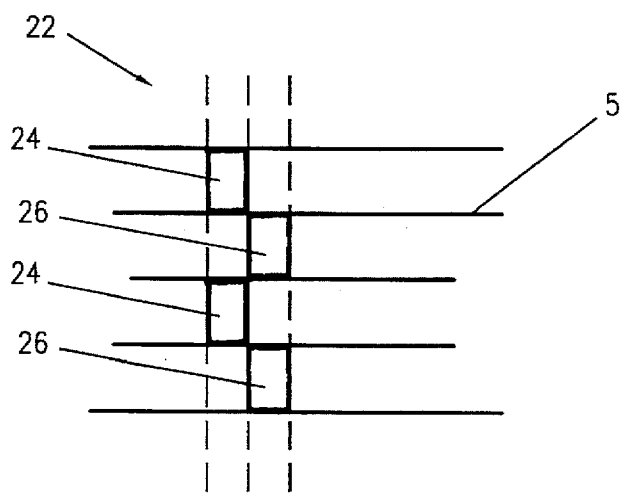
FIG. 4 shows a typical servo burst component of a position information data portion.

FIG. 4 shows typical servo burst 22 component of the position information data 10 portion of a track 5. The servo burst 22 consists of two bursts of information written at specific location of the track. The servo burst A 24 and servo burst B 26 are written between two tracks so that a head 6 positioned correctly on a track 5 would read equal signals from both servo burst A 24 and servo burst B 26. Thus, the displacement of a head 6 relative to a track 5 can be determined by measuring the amount of servo burst A 24 signal and the amount of servo burst B 26 signal read by the head.

Figure 5:
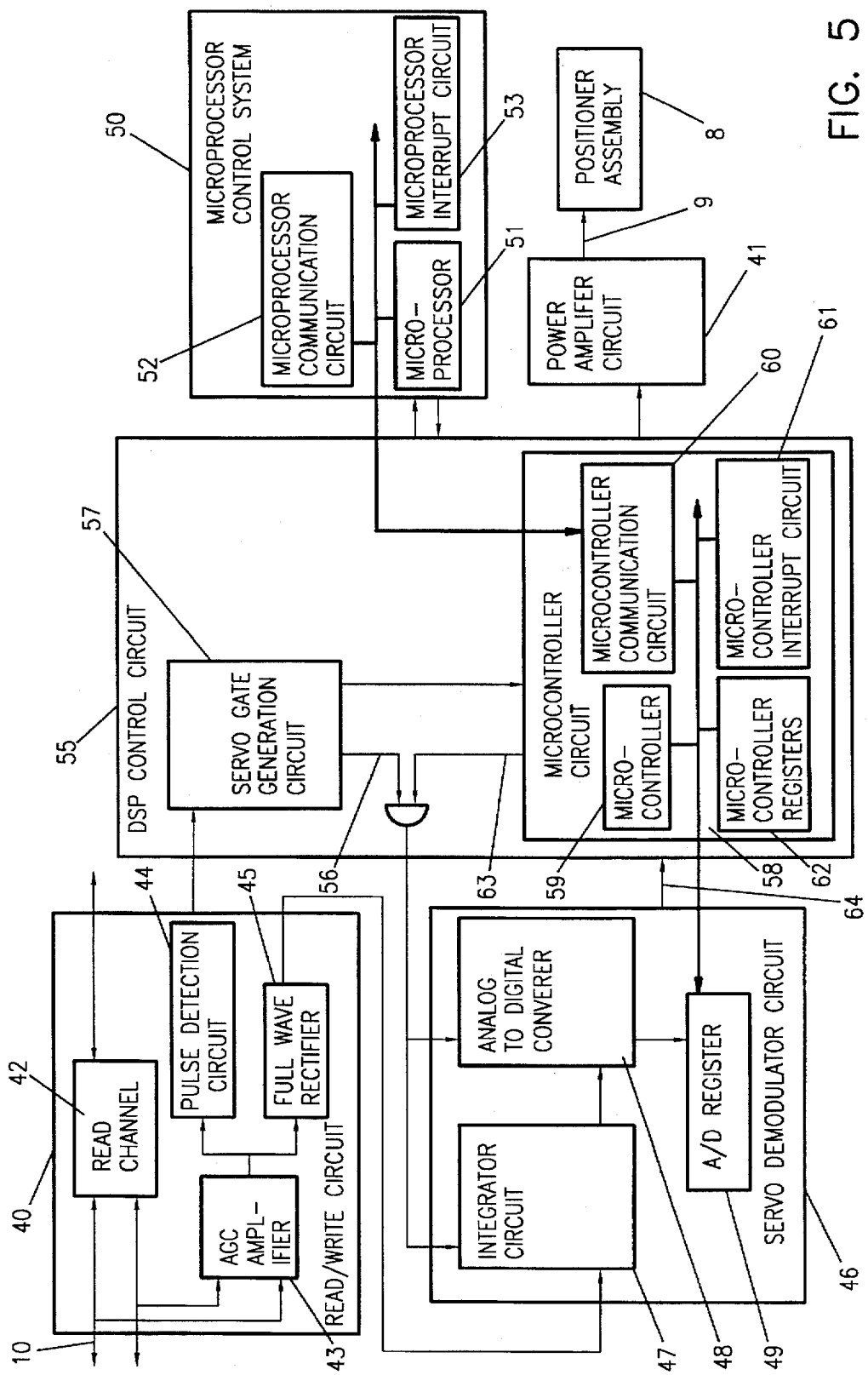
FIG. 5 shows a logical block diagram for servo control system implementing preferred embodiment of the invention.

FIG. 5 shows a logical block diagram for a servo control system 2 implementing preferred embodiment. Position information data 10 read from the disc media 3 is received as input to the read/write circuit 40 and corresponding positioning signal 9 to the positioner assembly is delivered as an output of a power amplifier circuit 41. The servo control circuit 2 further includes a servo demodulator circuit 46, a DSP control circuit 55 and a microprocessor control system 50. The read/write circuit 40 includes a read channel 42, AGC amplifier 43, pulse detection circuit 44 and a full wave rectifier 45. The position information data 10 is inputted to the AGC amplifier 43 and the output of the AGC amplifier 43 is fed to the full wave rectifier 45 and the pulse detection circuit 44. The output of the full wave rectifier 45 is fed as input to a servo demodulator circuit 46. The servo demodulator circuit includes an integrator circuit 47, an analog to digital converter 48 and plurality of A/D registers 49. The operation of the integrator circuit 47 and the analog to digital converter circuit 48 is enabled or disabled by a servo gating signal 56 from the DSP control circuit 55. The full wave rectified position information data 10 is received as an input to the integrator circuit 47 of the servo demodulator circuit 46. After integrating the full wave rectified position information data 10, the analog signal is fed to the analog to digital converter 48 which converts the analog signal into a digital value. This digital value of the position information data is saved in the A/D registers 49 for further processing by the DSP control circuit 55.

The microprocessor control system 50 includes a microprocessor 51, microprocessor communication circuit 52 and microprocessor interrupt circuit 53.

The DSP control circuit 55 includes a servo gate generation circuit 57 and a micro controller circuit 58. The micro controller circuit 58 includes a microcontroller 59, microcontroller communication circuit 60, microcontroller interrupt circuit 61 and plurality of microcontroller registers 62. The DSP control circuit 55 is driven by the micro controller circuit 58. The micro controller circuit 58 is responsible for the operation of the servo control system, under the direction of the microprocessor control system 50 external to the DSP control circuit 55. The micro controller circuit 58 and the microprocessor control system 50 communicate via the microcontroller communication circuit 60 and the microprocessor communication circuit 52 in combination with interrupt signals generated by microcontroller interrupt circuit 61 and microprocessor interrupt circuit 53. The microcontroller registers 62 are initialized by the microprocessor control system 50 so that appropriate control and timing signals necessary for the operation of the servo control system 2 can be generated. One of the plurality of microcontroller registers 62, an expect next servo gate register stores a timing value necessary to assert a servo gate enabling signal 63 active.

The servo gate generation circuit 57 of the DSP control circuit receives the output of pulse detection circuit 44 of the read/write circuit 40. Based upon the output of pulse detection circuit 64, the servo gate generation circuit 57 will generate servo gating signals 56 at appropriate time to enable the integrator circuit 47 and the analog to digital circuit 48 to read servo bursts. The servo gating signal 56 is applied to the integrator circuit 47 and the analog to digital circuit 48, provided the servo gate enabling signal 63 from the micro controller 58 is active. The timing to assert the servo gate enabling signal 63 active is determined by the microprocessor control system 50 and appropriate timing value is loaded into the expect next servo gate register of the micro controller circuit 58. The servo gate generation circuit 57 also indicates the presence or absence of servo burst signals to the micro controller circuit 58.

During a servo burst read operation, the microprocessor control system 50 communicates to the micro controller circuit 58 and sets up the timing for setting the servo gate enabling signal 63 active by setting the value of expect next servo gate register of the micro controller circuit 58. The servo gate enabling signal 63 is held active for a period when the servo gating signal 56 is expected to be generated by the servo gate generation circuit 57. The servo gating signal 56 enables the integrator circuit 47 and the analog to digital converter circuit 48. The corresponding analog servo burst signal is converted into a digital value and stored in the A/D registers 49. Then the servo demodulator 46 asserts a servo data ready signal 64 to the DSP control circuit 55, upon which corresponding digital value of the servo burst signal is read by the micro controller circuit 58. Based upon the value of the digital servo signal, the micro controller circuit 58 determines appropriate value of the positioning signal 9 to be applied to the positioner assembly 8 through the power amplifier circuit 41. If the output of pulse detection circuit 44 indicates the absence of servo burst, the micro controller 58 determines that no digital value of the servo signal will be available from the servo demodulator circuit 46 and continues to maintain previously determined value of the positioning signal 9 to be applied to the positioner assembly 8 through the power amplifier circuit 41.

After writing servo bursts, during a verification process, the servo burst 22 are read from the disc media and converted to a digital value by the servo demodulator circuit 46 and stored in the A/D registers 49. Then the DSP control circuit 55 reads the digital value of the servo burst signal and transfers the same to the microprocessor control system 50. The microprocessor control system 50 determines whether the digital value of the servo burst so read is within an acceptable range. If the digital value is not within an acceptable range, then the microprocessor control system 50 will set up the micro controller circuit 58 to reread the servo bursts 22, except the servo burst whose digital value was not within the acceptable range. This is accomplished by changing the value loaded to the expect next servo burst timing register so that the servo gate enabling signal 63 is held inactive during the time when the servo burst whose digital value was not acceptable is expected.

Figure 6:
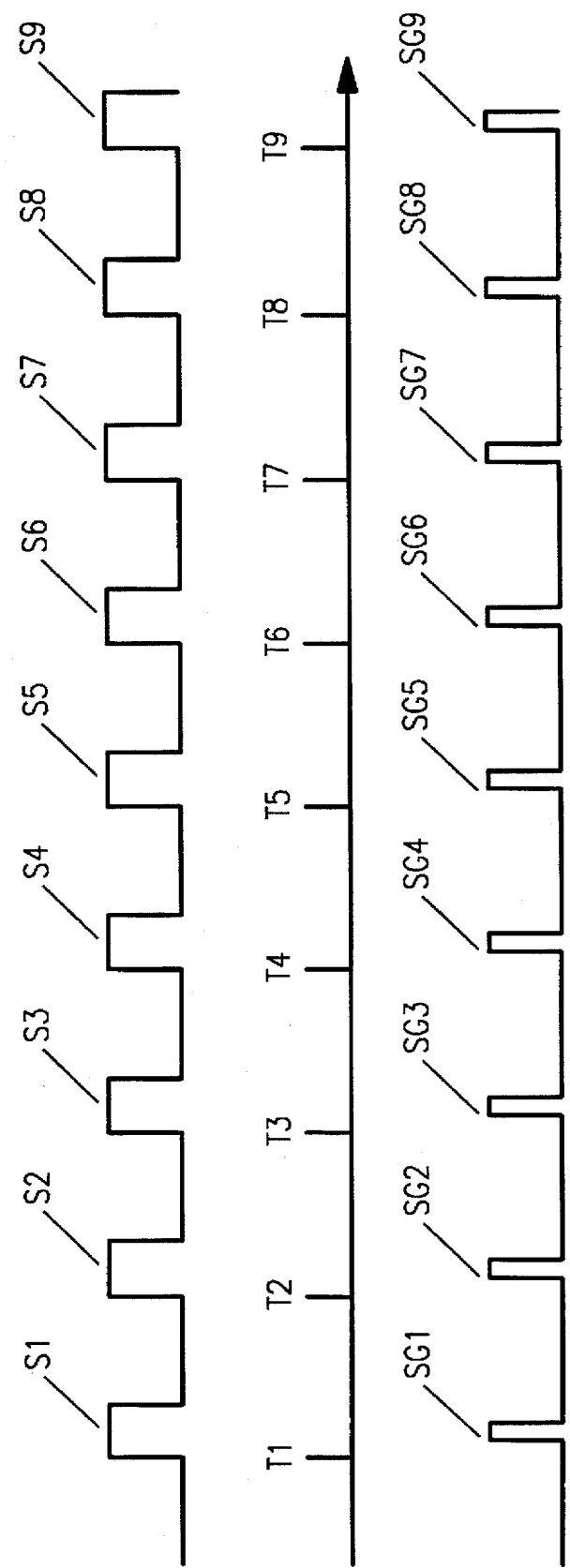
FIG. 6 shows servo gate enabling signals and servo gate signals for reading multiple servo bursts.

The FIG. 6 shows the servo gate enabling signals S1, S2, S3, S4, S5, S6, S7, S8 and S9 active during time periods T1, T2, T3, T4, T5, T6, T7, T8 and T9 enabling servo gating signals SG1, SG2, SG3, SG4, SG5, SG6, SG7, SG8 and SG9 to read nine servo bursts B1, B2, B3, B4, B5, B6, B7, B8 and B9 respectively. The servo bursts B1, B2, B3, B4, B5, B6, B7, B8 and B9 are not shown in the figure.

Figure 7:
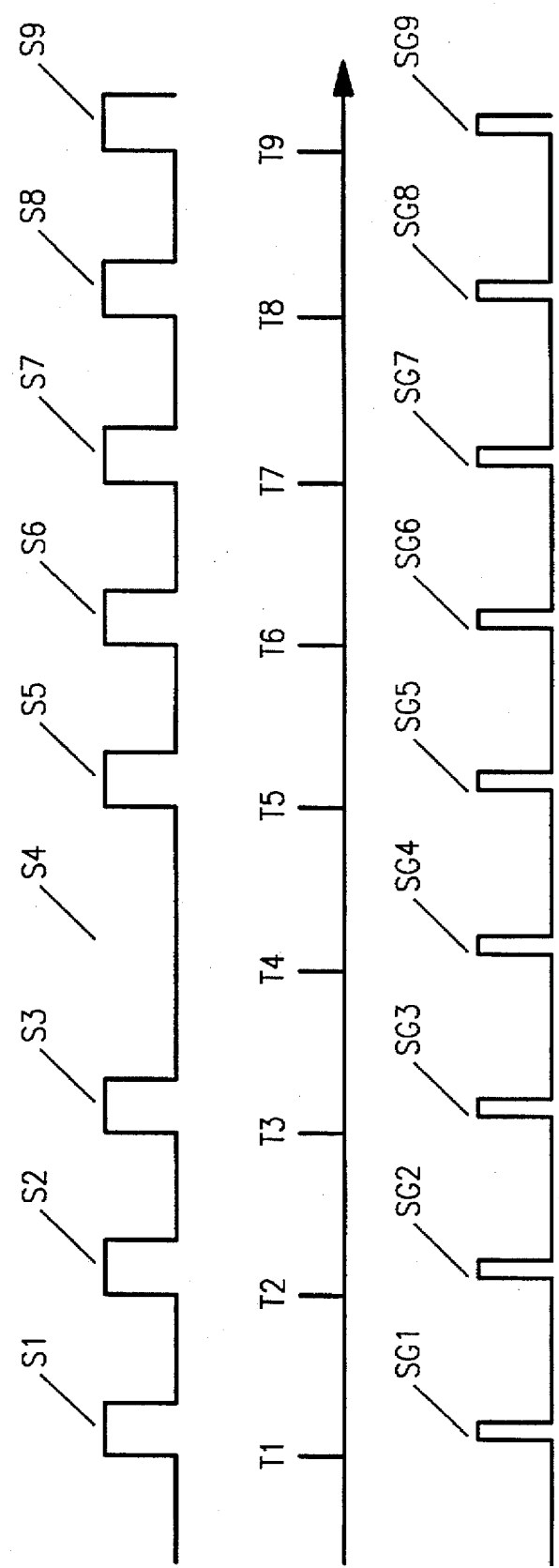
FIG. 7 shows servo gate signals and servo gate signal, enabling reading of plurality of servo bursts and disabling reading of a servo burst.

The FIG. 7 shows the servo gate enabling signals S1, S2, S3, S5, S6, S7, S8 and S9 as active, while servo gate enabling signal S4 at time period T4 as inactive. The figure also shows corresponding servo gates SG1, SG2, SG3, SG4, SG5, SG6, SG7, SG8 and SG9. Thus, according to FIG. 7, the servo burst B4 will not be read.

Using FIG. 6 and FIG. 7, the implementation of the preferred embodiment of the invention is explained. For example, let us assume that during a verification process, the digital value of servo burst signal B4 was not acceptable. Then, according to the teachings of this invention, the following steps are performed to accurately determine a defective servo burst.

Initially, the servo bursts B5, B6 and B7 are reread, while reading of servo burst B4, the first likely defective servo burst is disabled by not asserting the servo gate enabling signal S4 active. This is accomplished by appropriately setting the value of expect next servo gate register so that servo gate enabling signal S4 is not asserted active at time period T4. If the value of servo bursts B5, B6 and B7 are acceptable during the reread, then servo burst B4 is concluded as the first confirmed defective servo burst.

If the value of any servo bursts B5, B6 or B7 are not acceptable, then the reading of servo burst B3 is disabled and the digital value of servo bursts B4, B5 and B6 are reread. If the value of servo bursts B4, B5 and B6 are acceptable during the reread, then servo burst B3 is concluded as the first confirmed defective servo burst.

If the value of any servo bursts B4, B5 or B6 are not acceptable, then the reading of servo burst B2 is disabled and the digital value of servo bursts B3, B4 and B5 are reread. If the value of servo bursts B3, B4 and B5 are acceptable during the reread, then servo burst B2 is concluded as the first confirmed defective servo burst.

As another embodiment of this invention, in the example described above, let us assume that servo burst B2 was concluded as the first confirmed defective servo burst. Then, while continuing the verification process, let us assume that it was determined that servo burst B6 was a second likely defective servo burst. According to the teachings of an alternate embodiment of this invention, the following steps are performed to accurately determine a second confirmed defective servo burst.

Initially, the servo bursts B7, B8 and B9 are reread, while reading of first confirmed defective servo burst B2 and second likely defective servo burst B6 are disabled by not asserting the servo gate enabling signals S2 and S6 active. This is accomplished by appropriately setting the value of expect next servo gate register so that servo gate enabling signals S2 and S6 are not asserted active at time periods T2 and T6. If the value of servo bursts B7, B8 and B9 are acceptable during the reread, then the second likely defective servo burst B6 is concluded as a second confirmed defective servo burst.

If the value of any servo bursts B7, B8 or B9 are not acceptable, then the reading of first confirmed defective servo burst B2 and servo burst B5 are disabled and the digital value of servo bursts B6, B7 and B8 are reread. If the value of servo bursts B6, B7 and B8 are acceptable during the reread, then servo burst B5 is also concluded as a second confirmed defective servo burst.

If the value of any servo bursts B6, B5 or B4 are not acceptable, then the reading of first confirmed defective servo burst B2 and servo burst B4 are disabled and the digital value of servo bursts B5, B6 and B7 are reread. If the value of servo bursts B5, B6 and B7 are acceptable during the reread, then servo burst B4 is concluded as a second confirmed defective servo burst.

By using the isolation process disclosed above, a defective servo burst is accurately identified. It has been inventors experience that by skipping two servo bursts before the likely defective servo burst and verifying three servo bursts after the skipped servo burst yielded satisfactory results in identifying a defective servo burst. However, depending upon variations in a servo system, different number of servo bursts may have to be skipped.

Further, in the example disclosing alternate embodiment of the invention, a second defective servo burst was accurately determined. Again, depending upon variations in a servo system, if it is possible to mark more than two servo bursts in a track and still obtain sufficient position information samples to maintain the position of a head on track, the method can be modified to accurately determine additional defective servo bursts.

If in the unlikely event that a defective servo burst is not identified by the above method, then the servo burst that was identified as a likely defective servo burst is marked with a known signal, provided the number of such likely defective servo bursts do not exceed a threshold limit so that sufficient position information data samples are available per track to maintain the position of the head on track. If the number of likely defective servo bursts exceed the threshold limit, then the tracks are again rewritten with position information data.

The above disclosed method accurately identifies a defective servo burst or combination of defective servo bursts without destroying the actual servo burst while selectively disabling combinations of servo bursts prior to the likely defective servo burst identified during the first pass of reading and verifying the servo burst. The defective servo bursts so identified are later permanently marked by rewriting with a known signal.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A method of determining defective servo burst for a group of recording units on a recording medium, the recording medium having at least one group of recording unit, each group of recording unit having a plurality of tracks, each said track having plurality of position data portions and plurality of user data portions, each said position data portion having a servo burst each servo burst providing a position error information, a servo gate enabling signal enabling and disabling retrieval of said position error information, a method of determining a defective servo burst comprising the steps of:

reading each servo burst and obtaining corresponding position error information;

identifying a servo burst as a first likely defective servo burst;

confirming said first likely defective servo burst or a servo burst before said first likely defective servo burst as a first confirmed defective servo burst including the steps of:

first, while skipping said first likely defective servo burst, rereading plurality of servo bursts occurring after said skipping of said first likely defective servo burst;

determining corresponding position error information as acceptable and concluding said first likely defective servo burst as a first confirmed defective servo burst else second, repeatedly skipping a servo burst before said first likely defective servo burst and rereading plurality of servo bursts occurring after said skipping of a servo burst before said first likely defective servo burst until either determining corresponding position error information as acceptable and concluding skipped servo burst as a first confirmed defective servo burst or completing skipping of one or more of servo bursts.

2. The method as claimed in claim 1 wherein said step of identifying a servo burst as a first likely defective servo burst includes the steps of:

establishing a range of position information as acceptable;

comparing said position information with said range of position information and concluding said servo burst as a first likely defective servo burst if said position information outside said acceptable range of position information.

3. The method as claimed in claim 1 wherein said method of reading servo burst and obtaining corresponding position information includes applying said servo gate enabling signal enabling retrieval of said position information.

4. The method as claimed in claim 1 wherein said method of skipping said first likely defective servo burst includes applying said servo gate enabling signal disabling retrieval of said position information.

5. The method as claimed in claim 1 further comprising the step of marking said first confirmed defective servo burst.

6. A method of determining defective servo bursts for a group of recording units on a recording medium, the recording medium having at least one group of recording unit, each group of recording unit having a plurality of tracks, each said track having plurality of position data portions and plurality of user data portions, each said position data portion having a servo burst, each servo burst providing a position error information, a servo gate enabling signal enabling and disabling retrieval of said position error information, a method of determining plurality of defective servo bursts comprising the steps of:

reading each servo burst and obtaining corresponding position error information;

identifying a servo burst as a first likely defective servo burst;

confirming said first likely defective servo burst or a servo burst before said first likely defective servo burst as a first confirmed defective servo burst including the steps of:

first, while skipping said first likely defective servo burst, rereading plurality of servo bursts occurring after said skipping of said first likely defective servo burst;

determining corresponding position error information as acceptable and concluding said first likely defective servo burst as a first confirmed defective servo burst else second, repeatedly skipping a servo burst before said first likely defective servo burst and rereading plurality of servo bursts occurring after said skipping of a servo burst before said first likely defective servo burst until either determining corresponding corresponding position error information as acceptable and concluding skipped servo burst as a first confirmed defective servo burst or completing skipping of one or more of servo bursts; and while skipping said first confirmed defective servo burst, reading each servo burst and obtaining corresponding position error information;

identifying a servo burst as a second likely defective servo burst;

confirming said second likely defective servo burst or a servo burst before said second likely defective servo burst as a second confirmed defective servo burst.

7. The method as claimed 6 wherein said step of identifying a servo burst as a first likely defective servo burst includes the steps of:

establishing a range of position information as acceptable;

comparing said position information with said range of position information and concluding said servo burst as a first likely defective servo burst if said position information outside said acceptable range of position information.

8. The method as claimed in claim 6 wherein said method of reading servo burst and obtaining corresponding position information includes applying said servo gate enabling signal enabling retrieval of said position information.

9. The method as claimed in claim 6 wherein said method of skipping said first likely defective servo burst includes applying said servo gate enabling signal disabling retrieval of said position information.

10. The method as claimed in claim 6 wherein said step of identifying a servo burst is/a second likely defective servo burst includes the steps of:

establishing a range of position information as acceptable;

comparing said position information with said range of position information and concluding said servo burst as a second likely defective servo burst if said position information outside said acceptable range of position information.

11. The method as claimed in claim 6 wherein said method of confirming said second likely defective servo burst or a servo burst before said second likely defective servo burst as a second confirmed defective servo burst includes the steps of:

first, while skipping said second likely defective servo burst, rereading plurality of servo bursts occurring after said skipping of said second likely defective servo burst;

determining corresponding position error information as acceptable and concluding said second likely defective servo burst as a second confirmed defective servo burst else second, repeatedly skipping a servo burst before said second likely defective servo burst and rereading plurality of servo bursts occurring after said skipping of a servo burst before said second likely defective servo burst until either determining corresponding position error information as acceptable and concluding skipped servo burst as a second confirmed defective servo burst or completing skipping of one or more of servo bursts.

12. The method as claimed in claim 6 further comprising the step of marking said first confirmed defective servo burst and said second confirmed defective servo burst.

13. A method of determining defective servo burst for a group of recording units on a recording medium, the recording medium having at least one group of recording unit, each group of recording unit having a plurality of tracks, each said track having plurality of position data portions and plurality of user data portions, each said position data portion having a servo burst, each servo burst providing a position error information, a servo gate enabling signal enabling and disabling retrieval of said position error information, a method of determining a defective servo burst comprising the steps of:

reading each servo burst and obtaining corresponding position error information;

identifying a servo burst as a first likely defective servo burst;

confirming said first likely defective servo burst as a first confirmed defective servo burst including the steps of
while skipping said first likely defective servo burst, rereading plurality of servo bursts occurring after said skipping of said first likely defective servo burst;

determining corresponding position error information as acceptable or not acceptable and concluding said first likely defective servo burst as a first confirmed defective servo burst when said position error information from said plurality of servo bursts are acceptable.

14. The method as claimed in claim 13 further including the step of confirming a servo burst before said first likely defective servo burst as a first confirmed defective servo burst, when said position information from said plurality of servo bursts are not acceptable.

* * * * *